US012736003B2

(12) United States Patent
Osada

(10) Patent No.: US 12,736,003 B2
(45) Date of Patent: Sep. 15, 2026

(54) POST-PROCESSING SYSTEM

(71) Applicant: Isuzu Motors Limited, Yokohama (JP)

(72) Inventor: Katsushi Osada, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 19/050,188

(22) Filed: Feb. 11, 2025

(65) Prior Publication Data

US 2025/0264047 A1 Aug. 21, 2025

(30) Foreign Application Priority Data

Feb. 16, 2024 (JP) ................................ 2024-022172

(51) Int. Cl.

*F01N 3/20* (2006.01)
*B01F 23/213* (2022.01)
*B01F 25/433* (2022.01)
*F01N 3/24* (2006.01)

(52) U.S. Cl.

CPC ............ *F01N 3/2066* (2013.01); *F01N 3/24* (2013.01); *B01F 23/21322* (2022.01); *B01F 25/4331* (2022.01); *F01N 3/208* (2013.01); *F01N 2330/38* (2013.01); *F01N 2340/08* (2025.08); *F01N 2610/14* (2013.01)

(58) Field of Classification Search

CPC ........ F01N 3/206; F01N 3/2066; F01N 3/208; F01N 3/24; F01N 3/2892; F01N 13/009; F01N 13/08; F01N 13/1816; F01N 2240/20; F01N 2330/38; F01N 2340/08; F01N 2470/08; F01N 2470/18; F01N 2470/20; F01N 2610/02; F01N 2610/14; F01N 2610/1453; Y02T 10/12

See application file for complete search history.

(56) References Cited

U.S. PATENT DOCUMENTS

| | | | | |
|---|---|---|---|---|
| 2008/0155973 A1* | 7/2008 | Maruyama ............ | F01N 3/2066 60/299 |
| 2010/0186382 A1* | 7/2010 | Schroeder .............. | F01N 3/025 60/324 |

(Continued)

FOREIGN PATENT DOCUMENTS

| | | |
|---|---|---|
| JP | 2013-104393 | 5/2013 |
| JP | 2020-051408 | 4/2020 |
| JP | 2020-148146 | 9/2020 |

*Primary Examiner* — Binh Q Tran

(57) ABSTRACT

A post-processing system includes: a cylindrical first processing section extending in a first cylinder axis direction and processing exhaust discharged from an internal combustion engine; a cylindrical second processing section disposed on an exhaust downstream side compared to the first processing section, extending in a second cylinder axis direction, and processing the exhaust; a first pipe extending in a direction at a first angle to the first cylinder axis direction, rotatably disposed around a first cylinder axis, and guiding out the exhaust processed by the first processing section; a second pipe extending in a direction at a second angle to the second cylinder axis direction, rotatably disposed around a second cylinder axis, and introducing the exhaust processed by the second processing section; and a third pipe formed to form an angle obtained of the first angle and the second angle, and coupling the first pipe with the second pipe.

5 Claims, 12 Drawing Sheets

(56) References Cited

U.S. PATENT DOCUMENTS

| | | | | |
|---|---|---|---|---|
| 2012/0124983 | A1* | 5/2012 | Hong | F01N 3/2892 60/324 |
| 2013/0164181 | A1* | 6/2013 | Iijima | F01N 13/009 261/74 |
| 2015/0059319 | A1* | 3/2015 | Shiva | F01N 3/2066 60/295 |
| 2015/0101313 | A1* | 4/2015 | Mitchell | F01N 13/08 60/299 |
| 2017/0009638 | A1* | 1/2017 | Suetou | F01N 13/1855 |
| 2017/0152778 | A1* | 6/2017 | Li | F01N 3/0842 |

* cited by examiner

POST-PROCESSING SYSTEM

CROSS REFERENCE TO RELATED APPLICATION

This application claims the benefit of priority of Japanese Patent Application No. 2024-022172, filed on Feb. 16, 2024. The contents of the above application is all incorporated by reference as if fully set forth herein in its entirety.

TECHNICAL FIELD

The present disclosure relates to a post-processing system.

BACKGROUND ART

Conventionally, exhaust gas discharged from an internal combustion engine contains a particulate matter (PM). PM is generated by unburned fuel in a rich situation where the air-fuel ratio exceeds 1.5 times the theoretical air-fuel ratio. On the other hand, PM decreases in a lean situation where the air-fuel ratio is 1.5 times or less than the theoretical air-fuel ratio. Further, in the case of a diesel engine, there is a trade-off relationship such that in a rich situation where the air-fuel ratio exceeds 2 times the theoretical air-fuel ratio, oxygen becomes insufficient and PM is generated, and in a lean situation where air-fuel ratio approaches the theoretical air-fuel ratio or becomes less than the theoretical air-fuel ratio, the combustion temperature becomes high and nitrogen oxides (NOx) are generated.

A vehicle is equipped with a post-processing system that processes PM and NOx in exhaust gas. As an exhaust gas processing apparatus that processes PM, a diesel particulate filter (DPF) that collects and removes PM is known. Further, a diesel oxidation catalyst (DOC) is known, which increases the temperature of exhaust gas by oxidizing fuel (HC) injected after a combustion step, thereby promoting combustion in the DPF. Further, as an exhaust gas processing apparatus that processes NOx, a selective catalytic reduction apparatus (SCR) is known, which mixes a reducing agent such as ammonia with exhaust gas containing NOx and decomposes NOx into nitrogen and water.

The layout of the post-processing system, which is composed of a DPF, a DOC, an SCR, and the like, is set according to the vehicle type.

For example, Patent Literature (hereinafter, referred to as PTL) 1 discloses a post-processing system that is provided on the downstream side of a post-processing apparatus that purifies exhaust gas discharged from an internal combustion engine mounted on a vehicle. The post-processing system includes a tubular main body including therein a flow path of the exhaust gas purified by the post-processing apparatus, and the tubular main body includes a curved portion formed to be curved such that the curved portion is convex upward in a height direction of the vehicle.

Further, for example, PTL 2 discloses an exhaust purification system that includes a post-processing apparatus that allows exhaust gas to pass therethrough and purifies the exhaust gas, and adopts a layout in which the exhaust gas is reversed and introduced into the post-processing apparatus. In the exhaust purification system, the post-processing system includes a gas dispersion chamber that covers an inlet-side end surface of the post-processing apparatus and guides the exhaust gas into the post-processing apparatus through an exhaust gas introduction port from a direction substantially orthogonal to an axial center direction of the post-processing apparatus. An exhaust pipe line that guides the exhaust gas to the exhaust gas introduction port of the gas dispersion chamber is extended in the axial center direction of the post-processing apparatus, is bent in a direction away from the exhaust gas introduction port at a position immediately before the exhaust gas introduction port, is bent back in a hook shape, and is connected to the exhaust gas introduction port. In the post-processing system, a wind guiding structure is provided in the gas dispersion chamber to cooperate with a hook-shaped exhaust guide portion of the exhaust pipe line to allow a flow of the exhaust gas to be folded back in an arc shape toward the axial center of the post-processing apparatus.

Further, for example, PTL 3 discloses a post-processing system including a post-processing apparatus that includes the following: an exhaust pipe through which exhaust gas discharged from an internal combustion engine mounted on a vehicle flows; and a terminal section disposed on a lower side of the vehicle and on a downstream side of the exhaust pipe, and configured to discharge the exhaust gas from a right side or a left side of the vehicle to the left side or the right side of the vehicle. The post-processing apparatus is disposed, for example, on a downstream side of the exhaust pipe and on an upstream side of the terminal section, and is configured to purify the exhaust gas.

CITATION LIST

Patent Literature

PTL 1

Japanese Patent Application Laid-Open No. 2020-148146

PTL 2

Japanese Patent Application Laid-Open No. 2013-104393

PTL 3

Japanese Patent Application Laid-Open No. 2020-51408

SUMMARY OF INVENTION

Technical Problem

The layout of a plurality of components forming a post-processing system is set according to the vehicle type. In general, the shape, size, and the like of each of the plurality of components are changed in accordance with the layout variation.

Even in the post-processing systems described in PTLs 1 to 3, there is a problem in that it is necessary to change components in accordance with layout variations, making it difficult to achieve component sharing.

An object of the present disclosure is to provide a post-processing system capable of sharing components.

Solution to Problem

In order to achieve the above object, a post-processing system of the present disclosure includes:

a first processing section that extends in a direction of a first cylinder axis and processes exhaust discharged from an internal combustion engine, the first processing section having a cylindrical shape; and a second processing section that is disposed on an exhaust downstream side compared to the first processing section, extends in a direction of a second cylinder axis, and processes the exhaust, the second processing section having a cylindrical shape, in which the post-processing system further includes:

- a first pipe that extends in a direction at a first angle with respect to the direction of the first cylinder axis, is disposed to be rotatable around the first cylinder axis, and guides out the exhaust processed by the first processing section,
- a second pipe that extends in a direction at a second angle with respect to the direction of the second cylinder axis, is disposed to be rotatable around the second cylinder axis, and introduces the exhaust processed by the second processing section, and
- a third pipe that is formed to have an angle obtained by adding the first angle and the second angle and couples the first pipe with the second pipe.

Advantageous Effects of Invention

The present disclosure can achieve component sharing.

DESCRIPTION OF EMBODIMENTS

Figure 1:
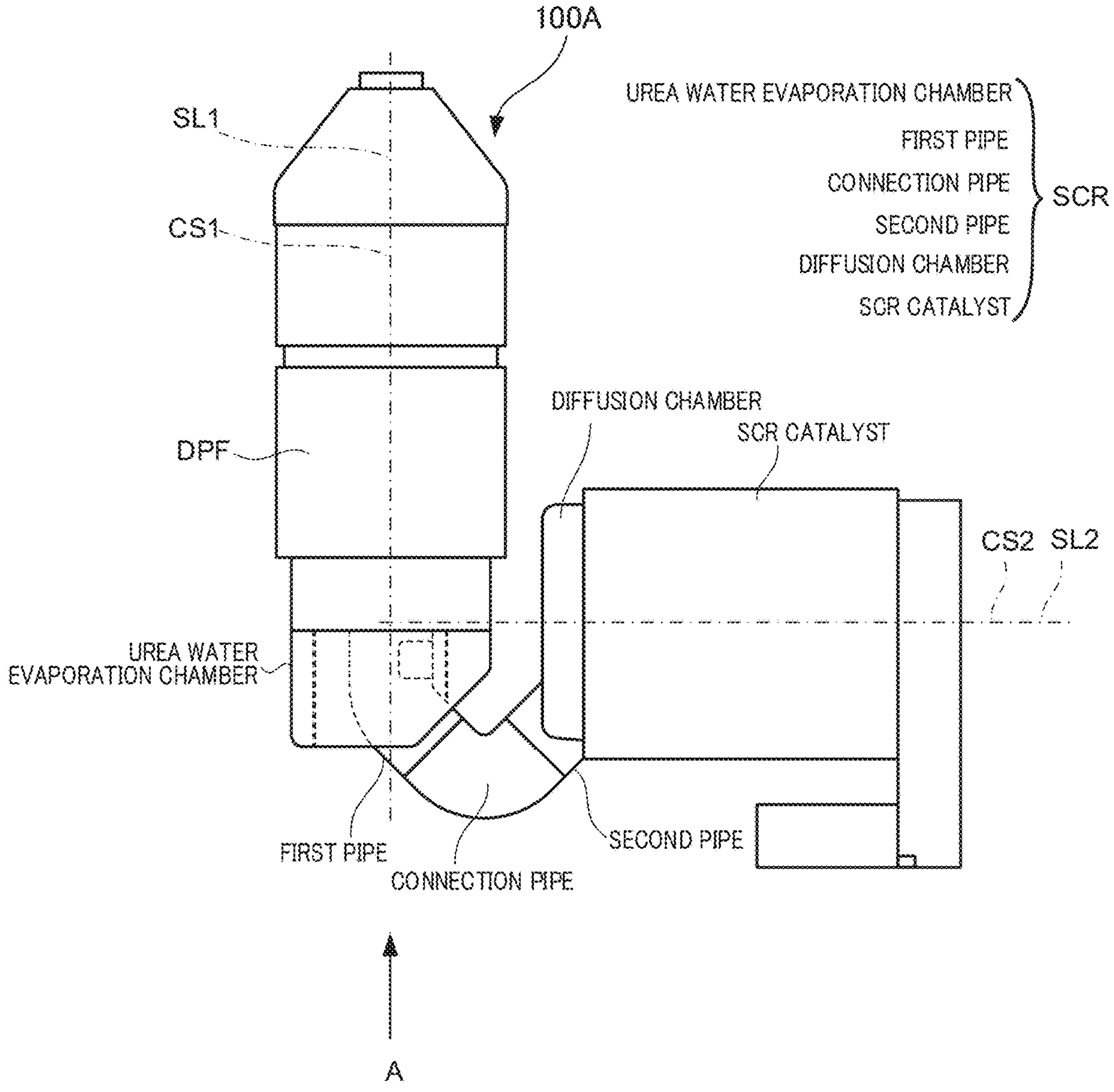
FIG. 1 illustrates an example of a layout of a post-processing system in an embodiment of the present disclosure.
Figure 2:
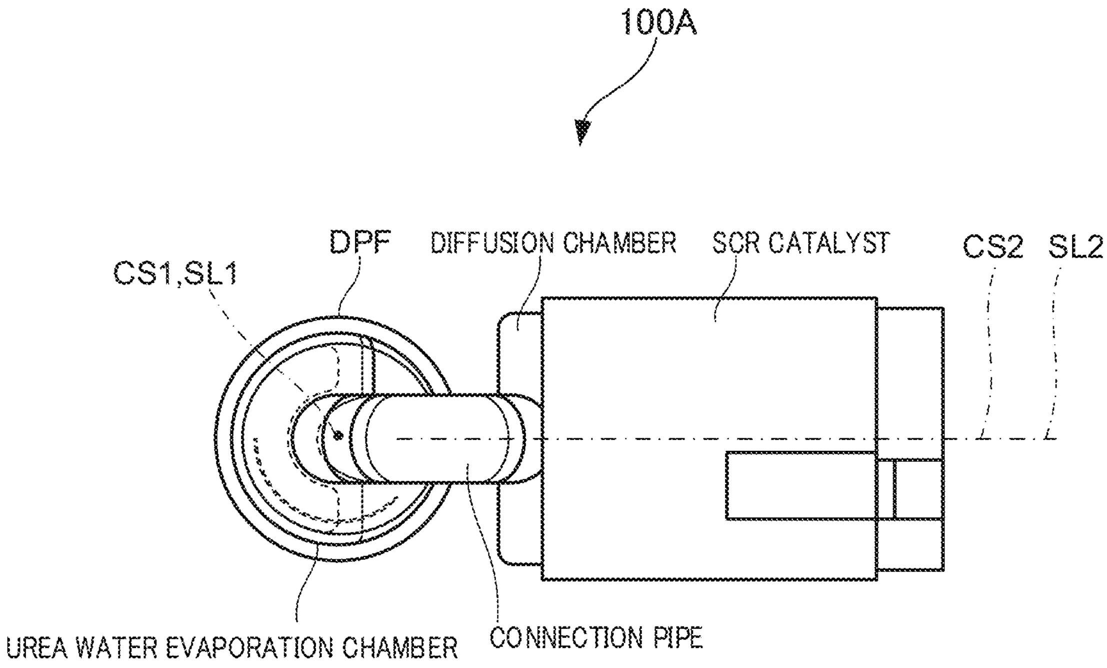
FIG. 2 is a view along arrow A in FIG. 1.

Hereinafter, an embodiment of the present disclosure will be described with reference to the drawings. FIG. 1 illustrates an example of a layout of a post-processing system in an embodiment of the present disclosure. FIG. 2 is a view along arrow A in FIG. 1. Post-processing system 100A illustrated in FIGS. 1 and 2 includes a diesel particulate filter (DPF) and a urea selective catalytic reduction apparatus (SCR). The layout of the DPF and the SCR is set according to the vehicle type. The DPF collects and removes a particulate matter (PM) from the exhaust gas emitted from an internal combustion engine. Post-processing system 100A may include a diesel oxidation catalyst (DOC) disposed on the exhaust upstream side of the DPF, which oxidizes fuel (HC) injected after a combustion step to increase the temperature of the exhaust gas and promote combustion within the DPF.

The DPF includes a cylindrical wall that extends in the cylinder axis direction. The cylinder axis direction is a direction that extends along straight line SL1.

The SCR is disposed on the exhaust downstream side of the DPF, and reduces nitrogen oxides (NOx) contained in the exhaust by mixing the exhaust, from which PM has been collected and removed by the DPF, with a reducing agent. Urea water ($(NH_2)_2CO$) is used as a reducing agent to be mixed with the exhaust. Urea water is decomposed into ammonia ($NH_3$) by the heat of the exhaust. Ammonia generated by the decomposition of the urea water reacts with nitrogen oxides (NOx). Through the above reaction process, nitrogen oxides are reduced to nitrogen ($N_2$) and water ($H_2O$).

Exhaust gas processing apparatus 100 (SCR) in the present embodiment includes a urea water evaporation chamber, a diffusion chamber, and an SCR catalyst. The layout of the urea water evaporation chamber, the diffusion chamber, and the SCR catalyst is set according to the vehicle type. Each of the urea water evaporation chamber, the diffusion chamber, and the SCR catalyst has a cylindrical wall and a cylinder axis.

The urea water evaporation chamber is disposed such that cylinder axis CS1 is along straight line SL1. Each of the diffusion chamber and the SCR catalyst is disposed such that cylinder axis CS2 is aligned on straight line SL2, which is orthogonal to straight line SL1. The first pipe disposed on the urea water evaporation chamber side and the second pipe disposed on the diffusion chamber side are coupled with each other by a third pipe (connection pipe 90). The urea water evaporation chamber promotes the decomposition of urea water. The diffusion chamber diffuses ammonia and nitrogen oxides in the exhaust. The SCR catalyst uses a hydrocarbon (HC) as a reducing agent. Thus, ammonia selectively reacts with nitrogen oxides in the exhaust to produce nitrogen and water.

In the present embodiment, three types of layout LYT1, layout LYT2, and layout LYT3 will be described. Layout LYT1 is a layout in which cylinder axis CS2 (straight line SL2) of the SCR catalyst is orthogonal to cylinder axis CS1 (straight line SL1) of the DPF. Layout LYT2 is a layout in which the DPF and the SCR catalyst are arranged in parallel. Layout LYT3 is a layout in which the DPF and the SCR catalyst are arranged in series.

(Layout LYT1)

Hereinafter, layout LYT1 will be described. In the following, layout LYT2 will be described, followed by a description of layout LYT3.

Figure 3:
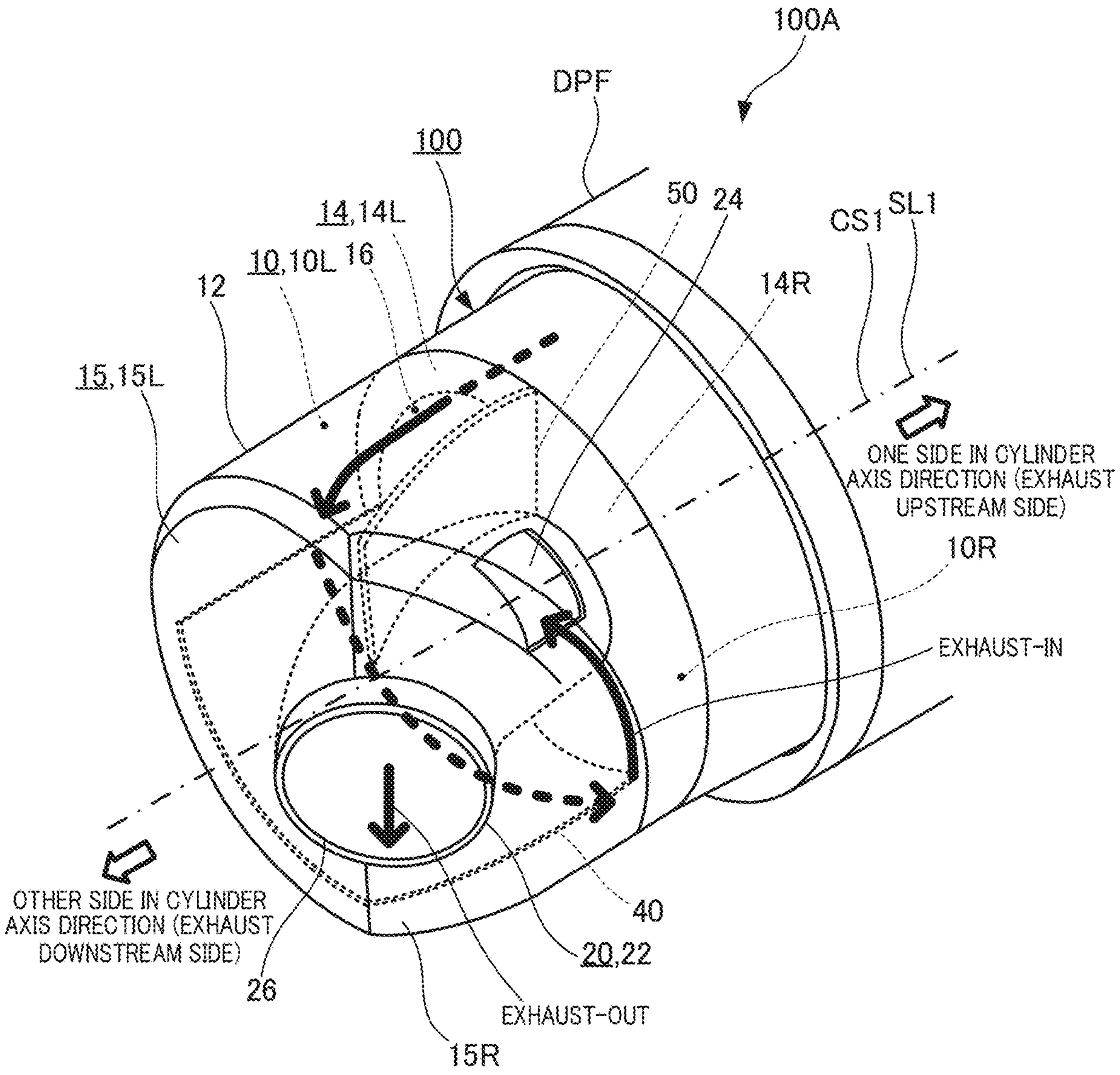
FIG. 3 is a perspective view illustrating a state in which an exhaust gas processing apparatus according to the embodiment of the present disclosure is assembled with a diesel particulate filter.
Figure 4:
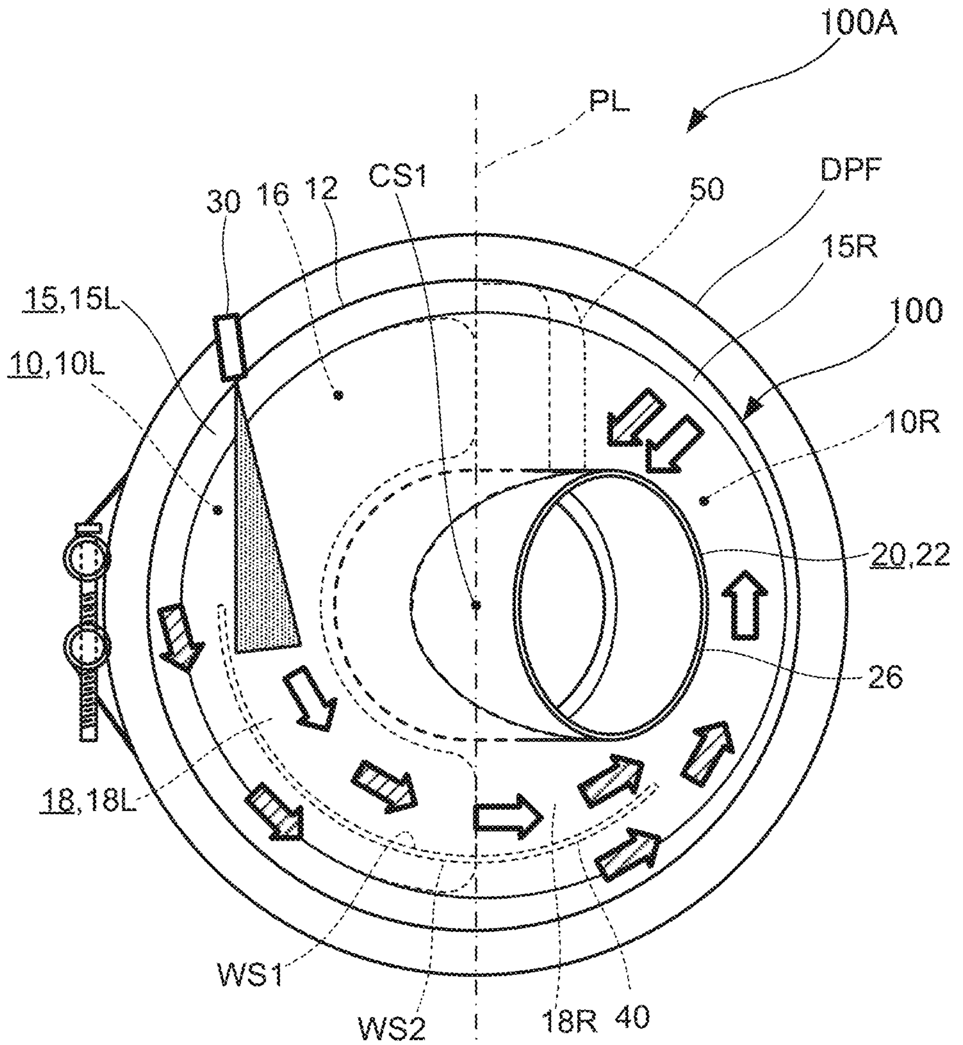
FIG. 4 is a front view illustrating the state in which the exhaust gas processing apparatus according to the embodiment of the present disclosure is assembled with the diesel particulate filter.
Figure 5:
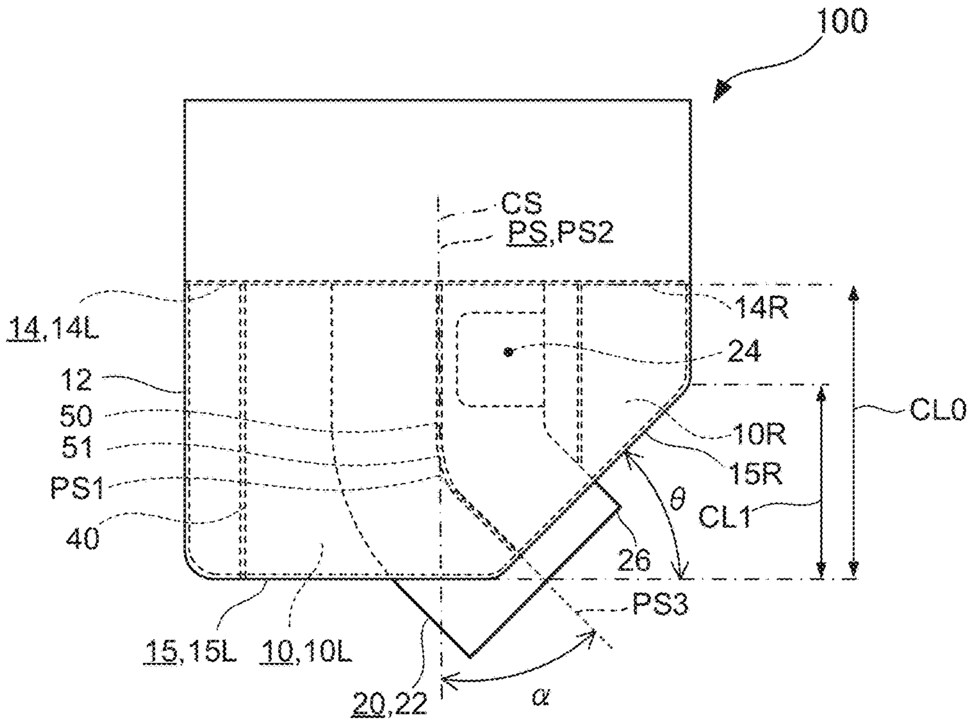
FIG. 5 is a plan view of the exhaust gas processing apparatus in the embodiment of the present disclosure.
Figure 6:
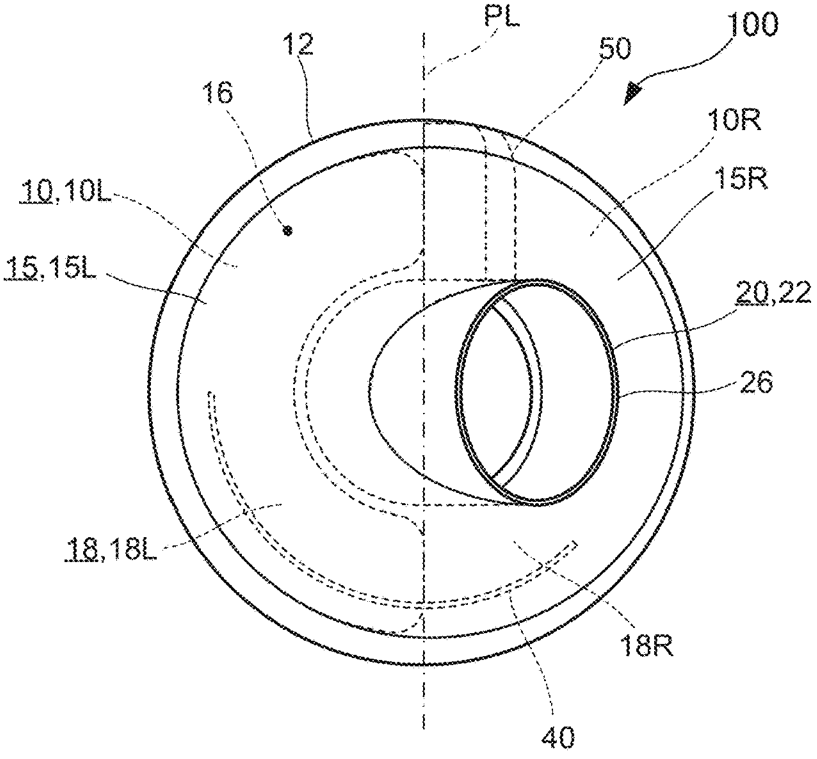
FIG. 6 is a front view of the exhaust gas processing apparatus in the embodiment of the present disclosure as viewed from the exhaust downstream side.
Figure 7:
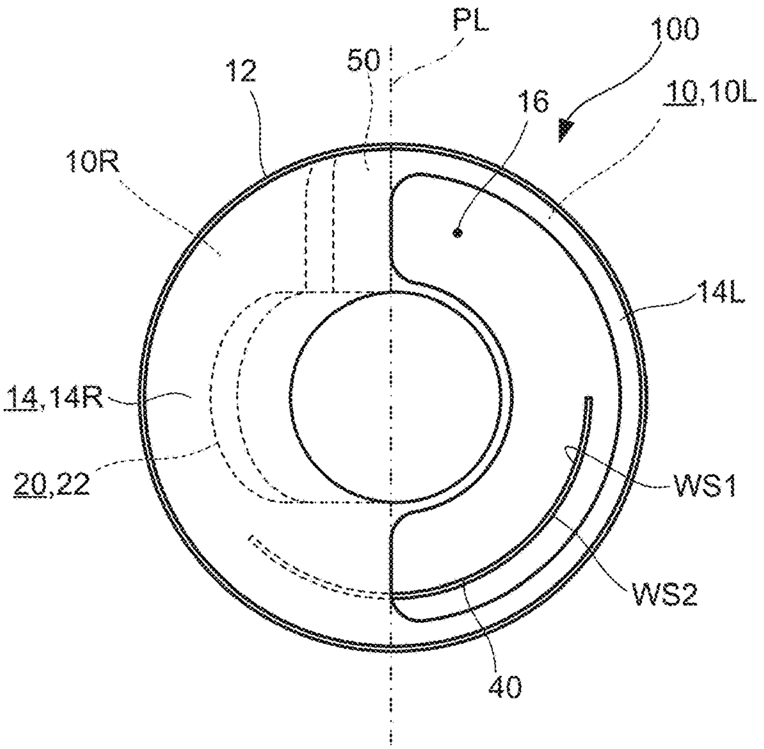
FIG. 7 is a rear view of the exhaust gas processing apparatus in the embodiment of the present disclosure as viewed from the exhaust upstream side.

In the present embodiment, exhaust gas processing apparatus 100 will be described using a urea water evaporation chamber as an example. FIG. 3 is a perspective view illustrating a state in which the exhaust gas processing apparatus is assembled with a DPF in the present embodiment. FIG. 4 is a front view illustrating the state in which the exhaust gas processing apparatus is assembled with the DPF in the present embodiment. FIG. 5 is a plan view of the exhaust gas processing apparatus according to the present embodiment. FIG. 6 is a front view of the exhaust gas processing apparatus in the present embodiment as viewed from the exhaust downstream side. FIG. 7 is a rear view of the exhaust gas processing apparatus in the present embodiment.

As illustrated in FIGS. 3 to 7, exhaust gas processing apparatus 100 includes urea water evaporation chamber 10 (hereinafter, simply referred to as "chamber"), pipe 20, injector 30 (see FIG. 4), reducing agent evaporation plate 40, and guidance plate 50. Chamber 10 corresponds to the "first processing section" of the present disclosure. Further, pipe 20 corresponds to the "first pipe" of the present disclosure.

(Chamber 10)

Chamber 10 includes, for example, cylindrical wall 12 formed of a stainless steel pipe. Partition line PL extending in the up-down direction in FIGS. 4 and 7 is indicated by a two-dot chain line. In the following description, the cylinder axis direction may be referred to as the "exhaust direction." Further, one side in the cylinder axis direction may be referred to as the "exhaust upstream side," and the other side in the cylinder axis direction may be referred to as the "exhaust downstream side." Further, a direction orthogonal to the cylinder axis direction may be referred to as a "radial direction." Further, a direction radially away from cylinder axis CS1 may be referred to as "one side in the radial direction" or "centrifugal direction," and a direction radially approaching cylinder axis CS1 may be referred to as "the other side in the radial direction" or "centripetal direction." Further, in FIG. 4 illustrating the front of exhaust gas processing apparatus 100, the right direction may be referred to as the "right side," and the left direction may be referred to as the "left side."

Chamber 10 includes one-side end wall 14 disposed at the end of the chamber on one side in the cylinder axis direction (exhaust upstream side) and the other-side end wall 15 disposed at the end of the chamber on the other side in the cylinder axis direction (exhaust downstream side).

As illustrated in FIGS. 3, 5, and 7, one-side end wall 14 is divided into two regions, namely left-side wall 14L that is located on the left side of partition line PL, and right-side wall 14R that is located on the right side of partition line PL. In FIG. 7, which is a rear view of exhaust gas processing apparatus 100, left-side wall 14L is illustrated at a position on the right side of partition line PL, and right-side wall 14R is illustrated at a position on the left side of partition line PL. One-side end wall 14 is a circular wall that extends in the radial direction with cylinder axis CS1 as the center. Introduction port 16 for introducing exhaust from the DPF (not illustrated) side is opened in one-side end wall 14. Introduction port 16 is an arc-shaped opening that has a predetermined width in the radial direction and extends in a counterclockwise direction from the 12 o'clock position to the 6 o'clock position of one-side end wall 14, which is a circular wall.

As illustrated in FIGS. 3 to 6, the other-side end wall 15 is divided into two regions, namely left-side wall 15L that is located on the left side of partition line PL and right-side wall 15R that is located on the right side of the partition line. The other-side end wall 15 closes the end of chamber 10 on the other side in the cylinder axis direction (exhaust downstream side). Left-side wall 15L has a wall surface that extends in a substantially semicircular shape in the radial direction from cylinder axis CS1. In other words, the wall surface of left-side wall 15L is a wall surface that extends in a counterclockwise direction from the 12 o'clock position to the 6 o'clock position. Right-side wall 15R has a wall surface that extends in a substantially semicircular shape in the radial direction from cylinder axis CS1. In other words, the wall surface of right-side wall 15R is a wall surface that extends in a counterclockwise direction from the 6 o'clock position to the 12 o'clock position. Further, the wall surface of right-side wall 15R is inclined at a predetermined angle θ with respect to the wall surface of left-side wall 15L toward the one side in the cylinder axis direction (exhaust upstream side) (see FIG. 5).

Chamber 10 is divided into two spaces, namely left-side chamber portion 10L that is located on the left side of partition line PL, and right-side chamber portion 10R that is located on the right side of partition line PL. The total length of left-side chamber portion 10L in the cylinder axis direction has a certain length CL0 (see FIG. 5). In contrast, the total length of right-side chamber portion 10R in the cylinder axis direction is gradually shortened from the 6 o'clock position to the 3 o'clock position in the counterclockwise direction, because the wall surface of right-side wall 15R is inclined to the one side in the cylinder axis direction (exhaust upstream side) with respect to cylinder axis CS1. Specifically, the total length of right-side chamber portion 10R in the cylinder axis direction is shortened from length CL0 to length CL1 (see FIG. 5). Thus, the cross-sectional area of right-side chamber portion 10R (the cross-sectional area on a plane orthogonal to the cylinder axis direction of right-side chamber portion 10R) is reduced from the other side in the cylinder axis direction toward the one side in the cylinder axis direction.

(Pipe 20)

Figure 8:
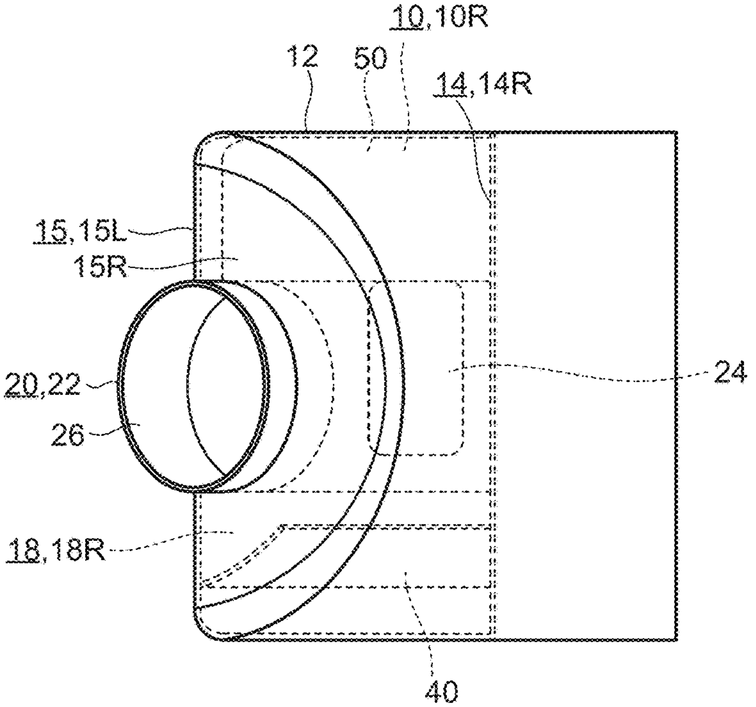
FIG. 8 is a right side view of the exhaust gas processing apparatus in the embodiment of the present disclosure.
Figure 9:
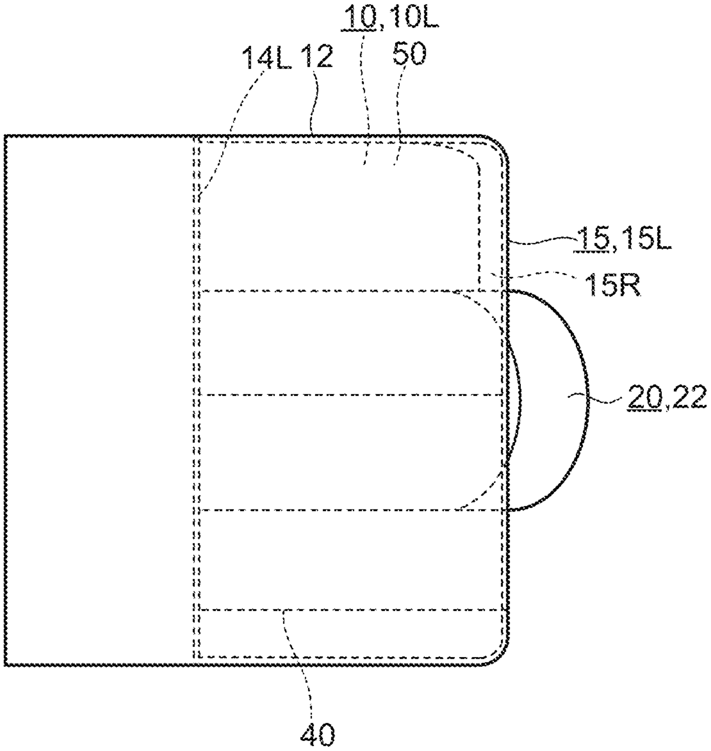
FIG. 9 is a left side view of the exhaust gas processing apparatus in the embodiment of the present disclosure.

FIG. 8 is a right side view of the exhaust processing apparatus in the present embodiment. FIG. 9 is a left side view of the exhaust gas processing apparatus in the present embodiment. As illustrated in FIGS. 3 to 6, 8, and 9, pipe 20 includes pipe axis PS and pipe peripheral wall 22, and is formed of, for example, a stainless steel pipe. FIG. 5 illustrates pipe axis PS with a broken line. Pipe 20 includes bent portion PS1 bent at a central portion in the pipe axis direction. Portion PS2 located closer to the one side than bent portion PS1 is in the pipe axis direction (herein also referred to as "one-side portion in the pipe axis direction PS2") extends along cylinder axis CS1. Portion PS3 located closer to the other side than bent portion PS1 is in the pipe axis direction (herein also referred to as "the other-side portion in the pipe axis direction PS3") extends in a direction inclined with respect to cylinder axis CS1 at a predetermined angle α (see FIG. 5). Inclination angle α of the other-side portion in the pipe axis direction PS3 with respect to cylinder axis CS1 coincides with inclination angle θ of the wall surface of right-side wall 15R with respect to the wall surface of left-side wall 15L (α=θ).

One end of pipe 20 in the pipe axis direction is a closed end that is closed by one-side end wall 14. The other end of pipe 20 in the pipe axis direction is an open end. In pipe peripheral wall 22 in one-side portion in the pipe axis direction PS2, inlet 24 is opened. Outlet 26 as an open end is provided in the other-side portion in the pipe axis direction PS3. Outlet 26 is disposed outside chamber 10.

Pipe peripheral wall 22 is disposed to be surrounded from the outside by cylindrical wall 12. Thus, circumferential space 18 that circumferentially extends is formed between pipe peripheral wall 22 and cylindrical wall 12. Circumferential space 18 is divided into two spaces, namely left-side circumferential space 18L (see FIG. 6) located on the left side of partition line PL and right-side circumferential space 18R (see FIG. 6) located on the right side of partition line PL, in the same manner as chamber 10, which is divided into two spaces by partition line PL. Further, similarly to the cross-sectional area of right-side chamber portion 10R, the cross-sectional area of right-side circumferential space 18R is reduced from the other side in the cylinder axis direction toward the one side in the cylinder axis direction. One side (exhaust upstream side) of left-side circumferential space 18L is in communication with introduction port 16. Thus, the exhaust from the DPF is introduced into left-side circumferential space 18L through introduction port 16, and the introduced exhaust is movable from left-side circumferential space 18L to right-side circumferential space 18R. Further, the exhaust that has moved to right-side circumferential space 18R is movable from the other side in the cylinder axis direction to one side in the cylinder axis direction. That is, the exhaust from the DPF is movable from left-side circumferential space 18L toward the one side of right-side circumferential space 18R in the cylinder axis direction. FIG. 3 illustrates the flow direction of the exhaust with a thick arrow.

(Injector 30)

Injector 30 is disposed in cylindrical wall 12 in left-side chamber portion 10L (see FIG. 4). The injection port of injector 30 is directed from cylindrical wall 12 side toward left-side circumferential space 18L. Thus, injector 30 can inject a reducing agent (urea water) toward the exhaust introduced from introduction port 16 into left-side circumferential space 18L. FIG. 4 illustrates the flow direction of the exhaust with hatched arrows and the flow direction of the reducing agent with white arrows.

(Reducing Agent Evaporation Plate 40)

Figure 10:
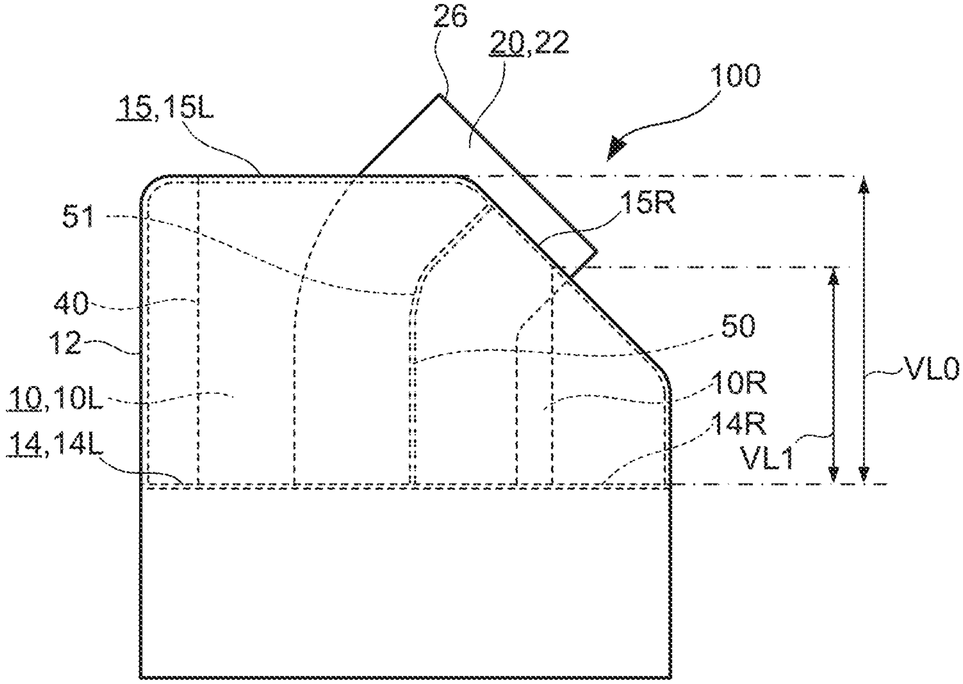
FIG. 10 is a bottom view of the exhaust gas processing apparatus in the embodiment of the present disclosure.

FIG. 10 is a bottom view of the exhaust gas processing apparatus in the present embodiment. As illustrated in FIGS. 3 to 10, reducing agent evaporation plate 40 is a flat plate member disposed in circumferential space 18 along cylindrical wall 12. Specifically, reducing agent evaporation plate 40 is disposed between cylindrical wall 12 and pipe peripheral wall 22, and circumferentially extends in a counterclockwise direction from the 9 o'clock position to the 4 o'clock position. That is, reducing agent evaporation plate 40 circumferentially extends from left-side circumferential space 18L to right-side circumferential space 18R. Further, reducing agent evaporation plate 40 includes inner wall surface WS1 facing pipe peripheral wall 22 and outer wall surface WS2 facing cylindrical wall 12. Inner wall surface WS1 is disposed such that the reducing agent injected from injector 30 hits inner wall surface WS1. Exhaust and a reducing agent (urea water) flow through the gap between pipe peripheral wall 22 and inner wall surface WS1. Exhaust flows through the gap between cylindrical wall 12 and outer wall surface WS2. Thus, the reducing agent that flows into the gap between pipe peripheral wall 22 and inner wall surface WS1 is decomposed into ammonia by the heat of the exhaust that flows into the gap between cylindrical wall 12 and outer wall surface WS2. Chamber 10 is called a "urea water evaporation chamber" because it decomposes the reducing agent (urea water) into ammonia using the heat of the exhaust.

The total length of reducing agent evaporation plate 40 in the cylinder axis direction in left-side circumferential space 18L has a certain length VL0 (see FIG. 10). The total length of reducing agent evaporation plate 40 in the cylinder axis direction in right-side circumferential space 18R is gradually shortened from the 6 o'clock position to the 4 o'clock position in the counterclockwise direction, similarly to the total length of right-side chamber portion 10R in the cylinder axis direction, because the wall surface of right-side wall 15R is inclined to the one side in the cylinder axis direction (exhaust upstream side) with respect to cylinder axis CS1. Specifically, the total length of reducing agent evaporation plate 40 in the cylinder axis direction in right-side circumferential space 18R is shortened from length VL0 to length VL1 (see FIG. 10).

(Guidance Plate 50)

Guidance plate 50 is bent at central portion 51 in the cylinder axis direction, similarly to pipe 20 bent at central portion (bent portion PS1) in the pipe axis direction. Guidance plate 50 extends in the radial direction from the 12 o'clock position of pipe peripheral wall 22 to cylindrical wall 12, with one side of the guidance plate in the radial direction connected to cylindrical wall 12 and the other side of the guidance plate in the radial direction connected to pipe peripheral wall 22. Thus, guidance plate 50 blocks the movement of the exhaust and ammonia that have moved from left-side circumferential space 18L (see FIG. 6) to right-side circumferential space 18R (see FIG. 6) from returning from right-side circumferential space 18R to left-side circumferential space 18L. The exhaust and ammonia move in right-side circumferential space 18R from the other side in the cylinder axis direction to the one side in the cylinder axis direction.

While guidance plate 50 blocks the movement of the exhaust and ammonia from right-side circumferential space 18R to left-side circumferential space 18L, guidance plate 50 guides the exhaust and ammonia, which have moved within right-side circumferential space 18R toward the one side in the cylinder axis direction, from right-side circumferential space 18R to inlet 24 side. The exhaust and ammonia guided to inlet 24 enter pipe 20 at a position on the one side of the pipe axis, move from that position to a position on the other side of the pipe axis, and are discharged to the outside of chamber 10 through outlet 26.

(SCR Catalyst 60, Diffusion Chamber 70, Second Pipe 80, and Connection Pipe 90)

Figure 11:
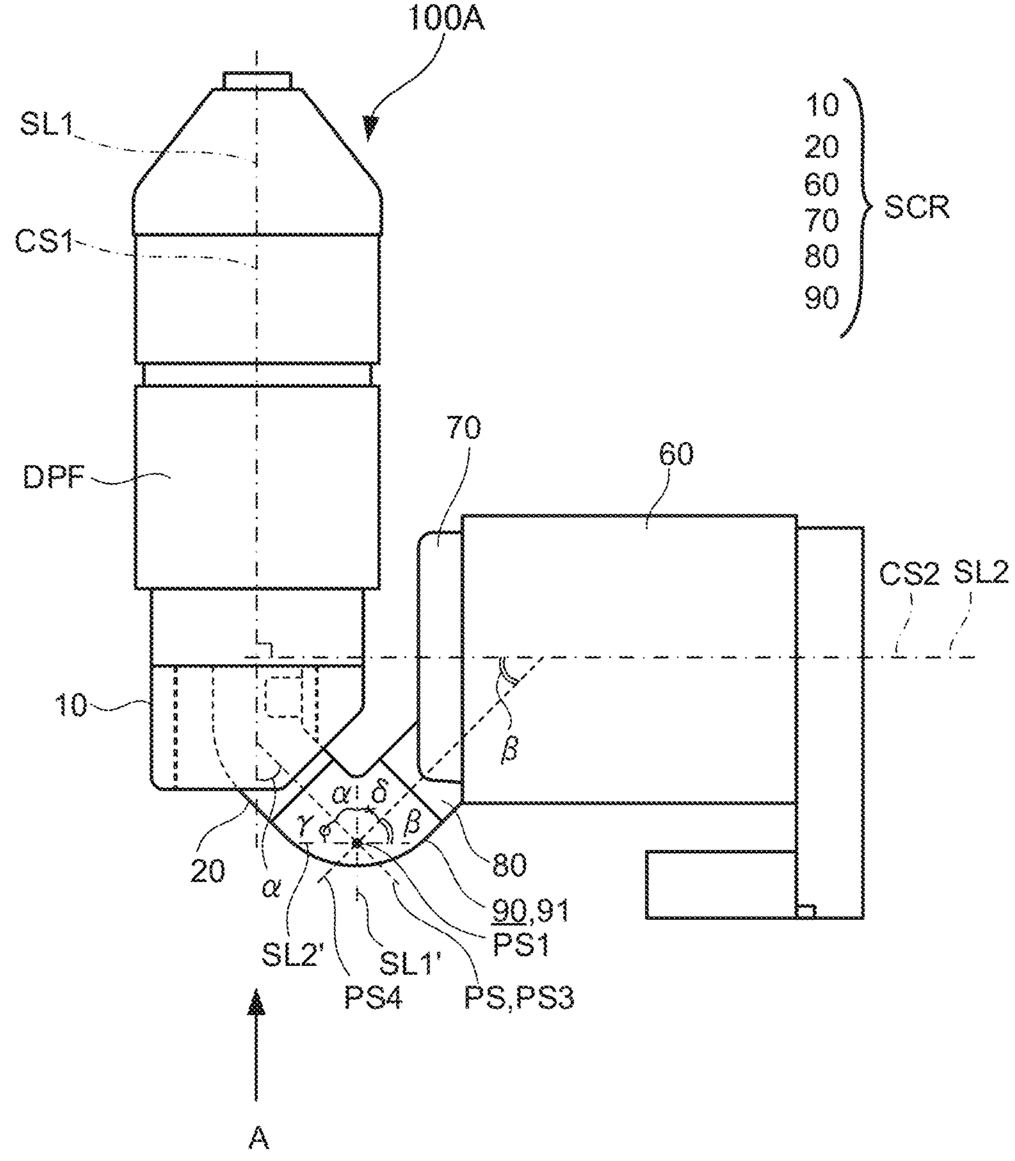
FIG. 11 illustrates an example of a layout of a post-processing system in an embodiment of the present disclosure.

In the following, layout LYT1 of post-processing system 100A in the present embodiment will be described with reference to FIG. 11. The DPF, the urea water evaporation chamber, the first pipe, the SCR catalyst, the diffusion chamber, the second pipe, and the third pipe (connection pipe 90) illustrated in FIG. 1 respectively correspond to the DPF, chamber 10, pipe 20, SCR catalyst 60, diffusion chamber 70, second pipe 80, and connection pipe 90 illustrated in FIG. 11. Further, chamber 10 and diffusion chamber 70 illustrated in FIG. 11 correspond to the "first chamber" and the "second chamber" in the present disclosure. FIG. 11 illustrates straight line SL1' parallel to straight line SL1 and straight line SL2' parallel to straight line SL2. As described above, cylinder axis CS2 (straight line SL2) is a straight line that is orthogonal to cylinder axis CS1 (straight line SL1). Accordingly, straight line SL2' is orthogonal to straight line SL1'.

As illustrated in FIG. 11, diffusion chamber 70 for diffusing the exhaust and ammonia is connected to chamber 10. Specifically, second pipe 80 is disposed at diffusion chamber 70. Second pipe 80 is coupled with pipe 20 (first pipe) through connection pipe 90 (third pipe). Thus, ammonia reacts with nitrogen oxides in the exhaust, and in the reaction process, the nitrogen oxides are reduced to nitrogen and water.

The other-side portion in the pipe axis direction PS3 of pipe 20 extends in a direction inclined at a predetermined angle $\alpha$ with respect to cylinder axis CS1, as described above. Further, pipe 20 is disposed to be rotatable around cylinder axis CS1 with respect to chamber 10. Then, pipe 20 is fixed to chamber 10 at a predetermined rotation angle.

Second pipe 80 includes pipe axis PS4 and a pipe peripheral wall, and is formed of, for example, a stainless steel pipe. Pipe axis PS4 is illustrated in FIG. 11 with a broken line. Pipe axis PS4 extends in a direction inclined at a predetermined angle β with respect to straight line SL2. The inlet of second pipe 80 is disposed outside diffusion chamber 70. The outlet of second pipe 80 communicates with the inside of diffusion chamber 70. Second pipe 80 is disposed to be rotatable around cylinder axis SC2 with respect to diffusion chamber 70. Then, second pipe 80 is fixed to diffusion chamber 70 at a predetermined rotation angle.

Connection pipe 90 includes an exhaust upstream side end portion connected to outlet 26 of pipe 20 and an exhaust downstream side end portion connected to the inlet of second pipe 80. A central portion between the end portion on the exhaust upstream side and the end portion on the exhaust downstream side of connection pipe 90 includes bent portion 91 that is bent at a predetermined angle (α+δ). As described above, straight line SL2' is orthogonal to straight line SL1'. Thus, angle δ is π/2−β. Further, angle γ shown in FIG. 11 is π/2−α.

In the following, it is assumed that the following relationships of equations (1) and (2) are satisfied between angles α, β, γ, and δ.

$$\alpha + \delta = \gamma + \delta = \alpha + \delta \quad (1)$$

$$\alpha + \beta + \gamma + \delta = \pi \quad (2)$$

From equations (1) and (2), the following equation is satisfied.

$$\alpha = \beta = \gamma = \delta = \pi/4 \quad (3)$$

That is, connection pipe 90 includes bent portion 91 that is bent at a predetermined angle (α+δ=π/2). In the present embodiment, connection pipe 90 may be in any form as long as the connection pipe forms a predetermined angle (α+β).

(Layout LYT2)

Figure 12:
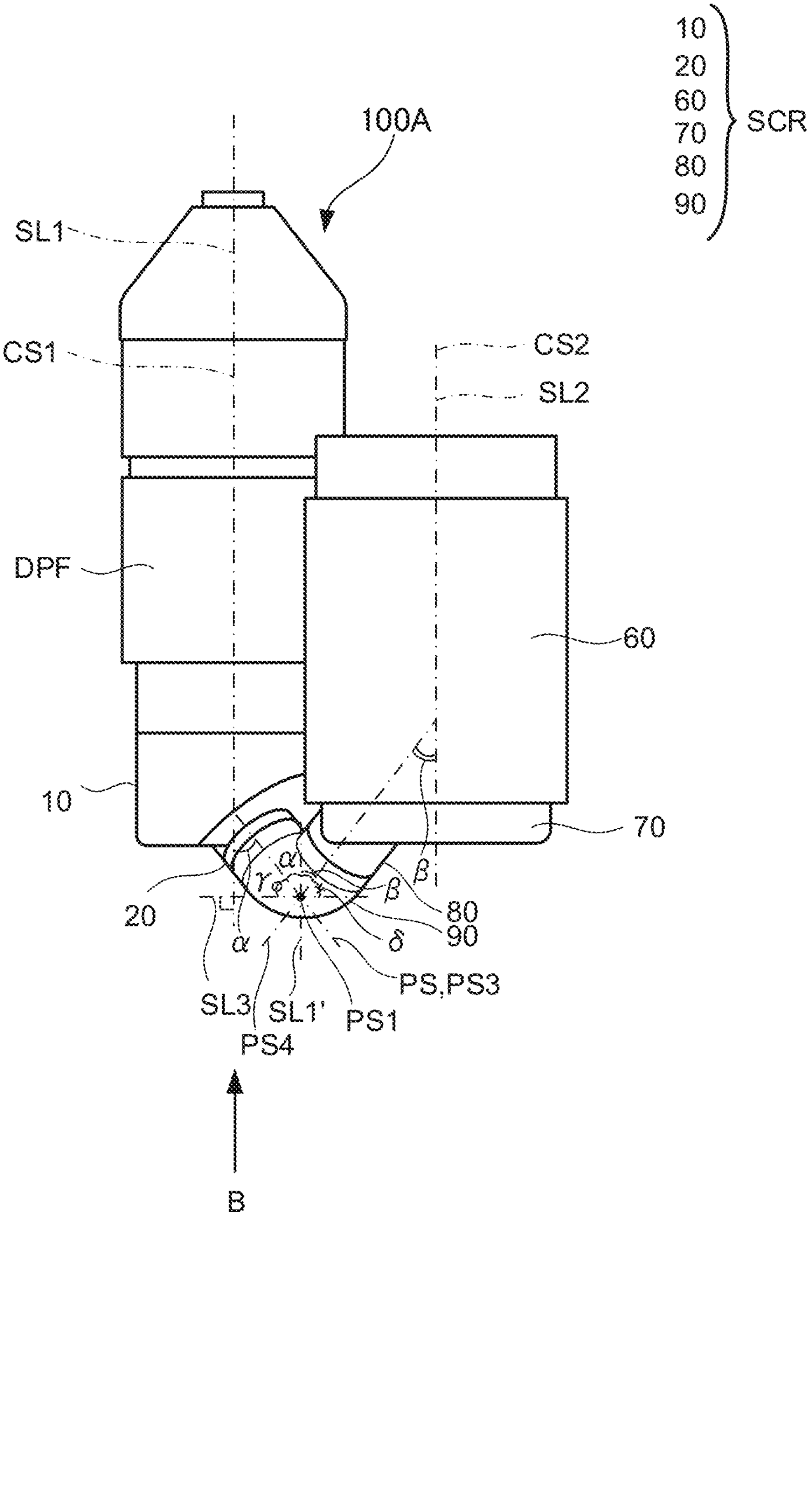
FIG. 12 illustrates another example of the layout of the post-processing system in the embodiment of the present disclosure.
Figure 13:
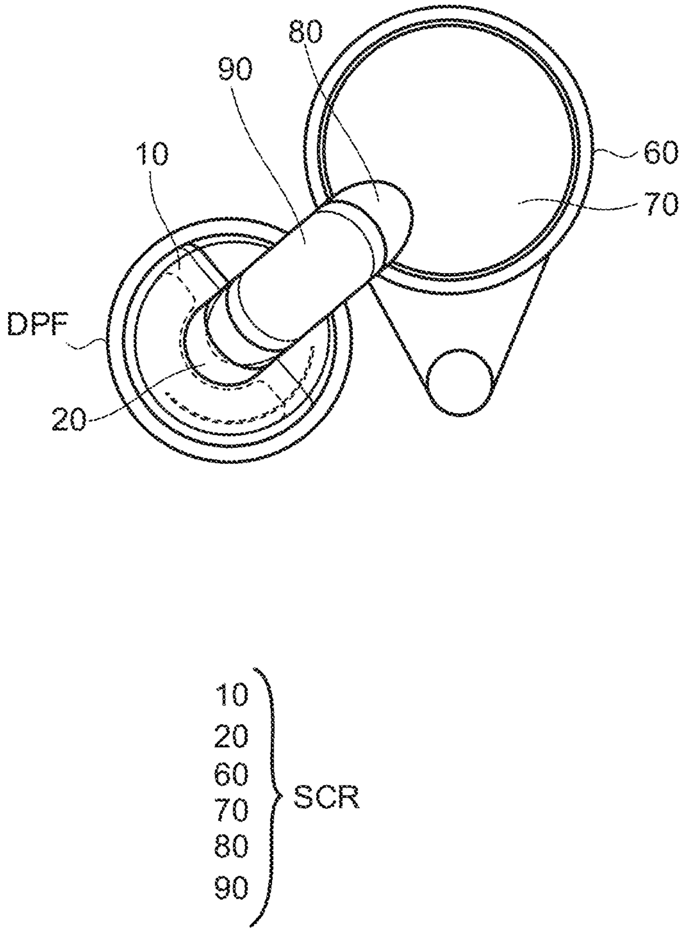
FIG. 13 is a view along arrow B in FIG. 12.

In the following, layout LYT2 will be described with reference to FIGS. 12 and 13. FIG. 12 illustrates another example of the layout of the post-processing system in the embodiment of the present disclosure. FIG. 13 is a view along arrow B in FIG. 12. In the description of layout LYT2, mainly the configuration different from that of layout LYT1 will be described, and the description of the same configuration will be omitted by attaching the same reference numerals.

As described above, layout LYT2 is a layout in which the DPF and the SCR catalyst are arranged in parallel.

In layout LYT2, equation (3) described above is satisfied in the same manner as in layout LYT1. Thus, even in a case where the layout of post-processing system 100A is set to layout LYT2 according to the vehicle type, the same components as chamber 10, pipe 20, SCR catalyst 60, diffusion chamber 70, second pipe 80, and connection pipe 90 forming exhaust gas processing apparatus 100 (SCR) in the above-described embodiment can be used.

(Layout LYT3)

Figure 14:
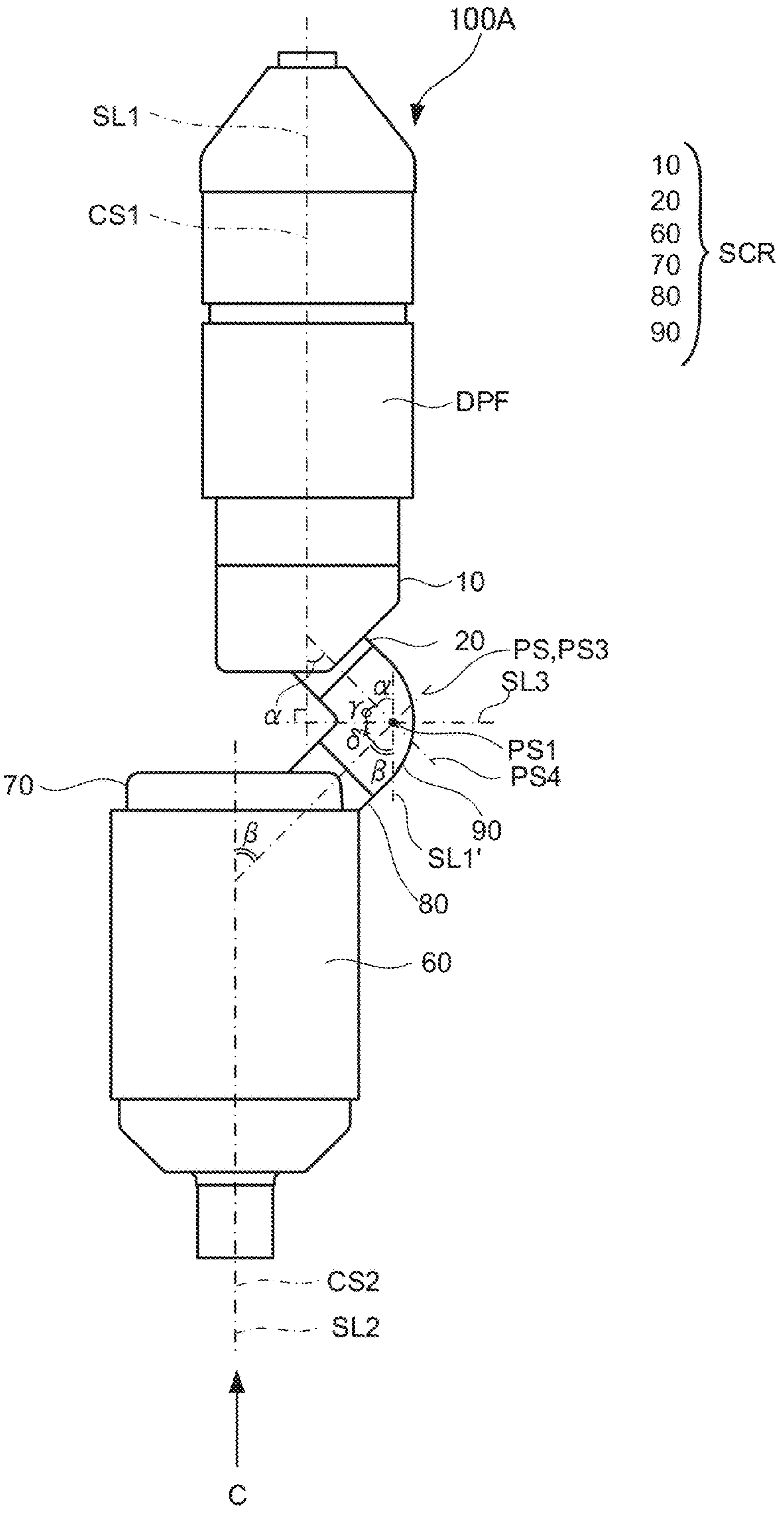
FIG. 14 illustrates another example of the layout of the post-processing system in the embodiment of the present disclosure.
Figure 15:
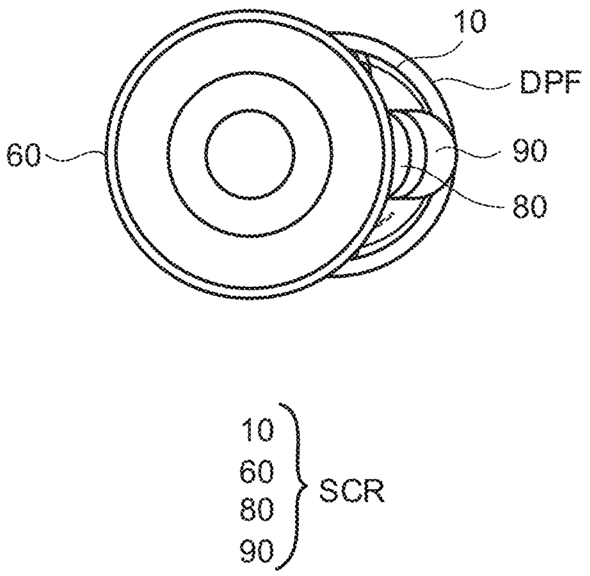
FIG. 15 is a view along arrow C in FIG. 14.

In the following, layout LYT3 will be described with reference to FIGS. 14 and 15. FIG. 14 illustrates another example of the layout of the post-processing system in the embodiment of the present disclosure. FIG. 15 is a view along arrow C in FIG. 14. In the description of layout LYT3, mainly the configuration different from that of layout LYT1 will be described, and the description of the same configuration will be omitted by attaching the same reference numerals.

As described above, layout LYT3 is a layout in which the DPF and the SCR catalyst are arranged in series.

In layout LYT3, equation (3) described above is satisfied in the same manner as in layout LYT1. Thus, even in a case where the layout of post-processing system 100A is set to layout LYT3 according to the vehicle type, the same components as chamber 10, pipe 20, SCR catalyst 60, diffusion chamber 70, second pipe 80, and connection pipe 90 forming exhaust gas processing apparatus 100 (SCR) in the above-described embodiment can be used.

Post-processing system 100A in the above embodiment includes the following: cylindrical chamber 10 (urea water evaporation chamber) that extends in cylinder axis CS1 direction and processes exhaust discharged from an internal combustion engine; and cylindrical diffusion chamber 70 that is disposed on the exhaust downstream side compared to chamber 10, extends in cylinder axis CS2 direction, and processes exhaust. Post-processing system 100A further includes the following: pipe 20 (first pipe) that extends in a direction at a first acute angle with respect to cylinder axis CS1 direction, is disposed to be rotatable around cylinder axis CS1, and guides out exhaust processed by chamber 10; second pipe 80 that extends in a direction at a second acute angle with respect to cylinder axis CS2 direction, disposed to be rotatable around cylinder axis CS2, and introduces exhaust processed by diffusion chamber 70; and connection pipe 90 that is formed to form the first angle and the second angle and couples pipe 20 with second pipe 80.

With the above configuration, it is possible to dispose chamber 10 (urea water evaporation chamber) and diffusion chamber 70 in such a way that cylinder axis CS1 and cylinder axis CS2 are orthogonal to each other, or to dispose the chamber and the diffusion chamber in parallel with each other or in series with each other. Therefore, it is possible to set the layout of post-processing system 100A according to the vehicle type without changing the components forming the post-processing system. Thus, it is possible to achieve the sharing of components in post-processing system 100A.

In the post-processing system in the above embodiment, pipe 20 (first pipe), second pipe 80, and connection pipe 90 (third pipe) have the same diameter. Thus, it is possible to suppress a change in the flow velocity of the exhaust flowing through pipe 20, second pipe 80, and connection pipe 90. Further, it is possible to manufacture the pipes using the same material.

The post-processing system in the above embodiment includes the following: chamber 10 disposed at the end of a first processing section, the end being on the exhaust downstream side; and a mixer apparatus that mixes a reducing agent with the exhaust and is disposed in chamber 10. The post-processing system further includes the following: diffusion chamber 70 disposed at the end of a second processing section, the end being on the exhaust upstream side; and a diffusion apparatus that diffuses the mixed exhaust and reducing agent and is disposed in diffusion chamber 70. Thus, it is possible to share each component of chamber 10, diffusion chamber 70, the mixer apparatus, and the diffusion apparatus.

In the post-processing system in the above embodiment, the first acute angle is the same angle as the second acute angle, which is π/4. Thus, the bending angle of bent portion 91 of connection pipe 90, which is bent at an angle obtained by adding the first acute angle and the second acute angle, becomes π/2.

In the post-processing system in the above embodiment, the first angle of pipe 20 with respect to cylinder axis CS1 direction is described as the first acute angle, but may be a right angle or an obtuse angle. Further, the second angle with respect to cylinder axis CS2 of second pipe 80 is described as a second acute angle, but may be a right angle or an obtuse angle. For example, the first angle may be a right angle or an obtuse angle, and the second angle may be an acute angle, or conversely, the first angle may be an acute angle, and the second angle may be a right angle or an obtuse angle. Further, for example, the first angle may be an obtuse angle, and the second angle may also be an obtuse angle. Even in this case, connection pipe 90 is formed to have an angle obtained by adding the first angle and the second angle. For example, in a case where the first angle is a right angle and the second angle is a right angle, connection pipe 90 is formed to have two right angles. In other words, connection pipe 90 is a pipe that is not bent and extends straight.

Each of the above-described embodiment merely shows an example of specific implementation of the present disclosure, and the technical scope of the present disclosure should not be construed to be limited thereto. That is, the present disclosure can be implemented in a variety of ways without departing from the spirit or essential features thereof.

INDUSTRIAL APPLICABILITY

The present disclosure is suitably utilized in a vehicle including a post-processing system in which sharing of components is required.

The invention claimed is:

1. A post-processing system comprising:

a first processing section that extends in a direction of a first cylinder axis and processes exhaust discharged from an internal combustion engine, the first processing section having a cylindrical shape; and a second processing section that is disposed on an exhaust downstream side compared to the first processing section, extends in a direction of a second cylinder axis, and processes the exhaust, the second processing section having a cylindrical shape, wherein the post-processing system further comprises:

a first pipe that extends in a direction at a first angle with respect to the direction of the first cylinder axis, is disposed on the first processing section to be rotatable around the first cylinder axis, and guides out the exhaust processed by the first processing section, a second pipe that extends in a direction at a second angle with respect to the direction of the second cylinder axis, is disposed on the second processing section to be rotatable around the second cylinder axis, and introduces the exhaust processed by the second processing section, and a third pipe that is formed to have an angle obtained by adding the first angle and the second angle and couples the first pipe with the second pipe.

2. The post-processing system according to claim 1, wherein the first pipe, the second pipe, and the third pipe have identical diameters.

3. The post-processing system according to claim 1, further comprising:

a first chamber disposed at an end of the first processing section, the end being on the exhaust downstream side;

a mixer apparatus that mixes a reducing agent with the exhaust and is disposed in the first chamber;

a second chamber disposed at an end of the second processing section, the end being on an exhaust upstream side; and a diffusion apparatus that diffuses the mixed exhaust and the reducing agent and is disposed in the second chamber.

4. The post-processing system according to claim 1, wherein the first angle is a first acute angle, and the second angle is a second acute angle.

5. The post-processing system according to claim 4, wherein the first acute angle and the second acute angle are identical to each other and are $\pi/4$.

* * * * *